Dec. 19, 1961     C. R. SATRUM     3,013,638
AUTOMATIC SLACK TAKE-UP MECHANISM FOR CAM-OPERATED BRAKES
Filed March 26, 1959
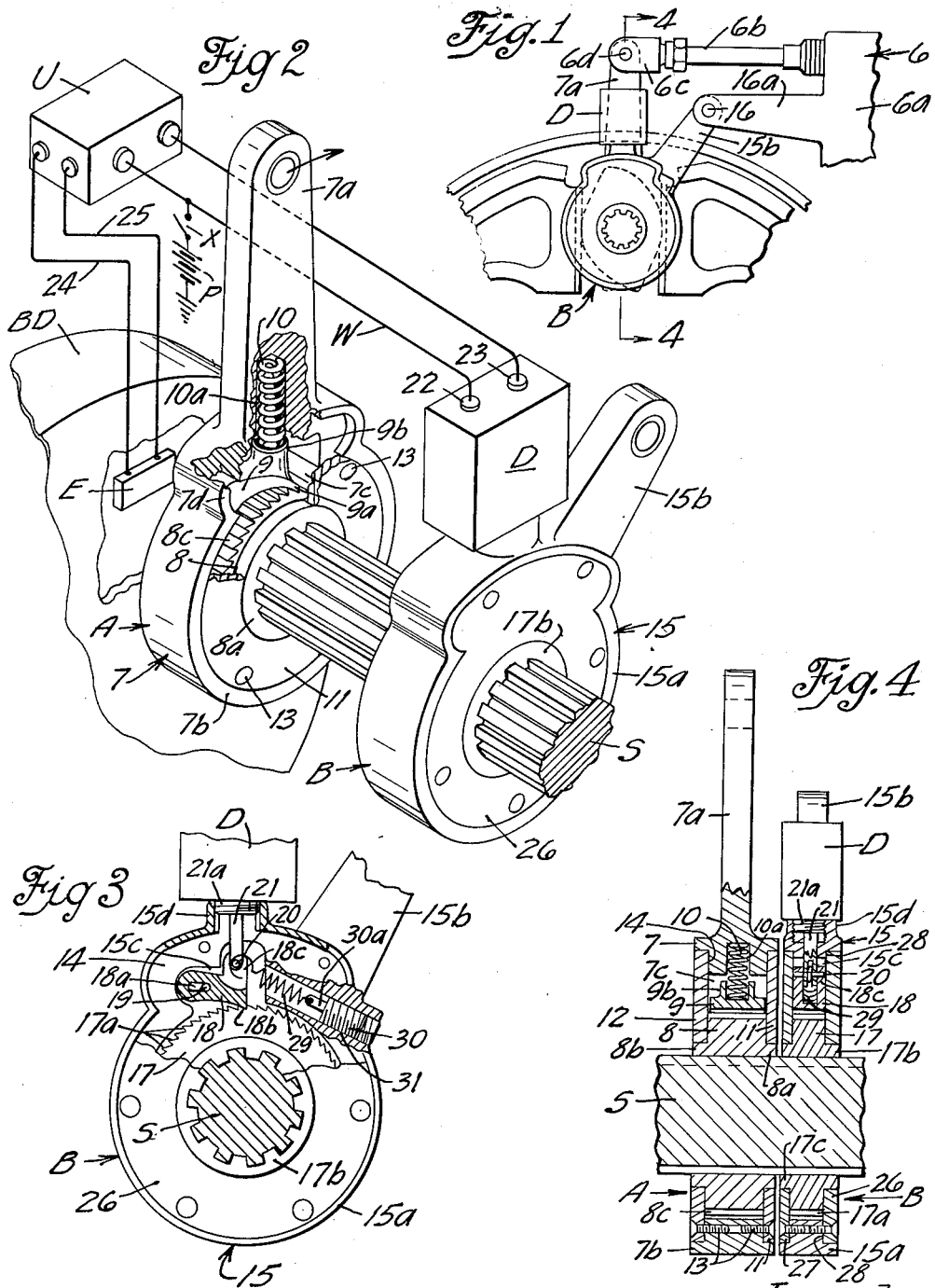
Inventor
Clarence R. Satrum
By Williamson, Schroeder & Palmatier
Attorneys

United States Patent Office 3,013,638
Patented Dec. 19, 1961

3,013,638
AUTOMATIC SLACK TAKE-UP MECHANISM FOR CAM-OPERATED BRAKES
Clarence R. Satrum, 224 W. 28th St., Minneapolis, Minn.
Filed Mar. 26, 1959, Ser. No. 802,179
9 Claims. (Cl. 188—79.5)

This invention relates to mechanism for automatically taking up the slack and efficiently adjusting working clearance in the actuating linkage of brakes for automotive vehicles, such as the heavy duty cam-operated brakes commonly used on trucks, busses, trailers and the like.

Most heavy vehicles of the class enumerated usually utilize power operated brake systems, the usual type employing for each dual wheel a cam acting between the free ends of floating brake shoes to spread such ends apart and urge the shoes into engagement with the rotating brake drum. Generally such brakes are power operated by means of positive air pressure or vacuum, and the mechanical linkage usually consists of a fluid piston motor having an actuating rod extending therefrom which is connected by a suitable lever arm to the brake cam shaft. Such vehicles, being heavy, will encounter rapid brake lining wear particularly during prolonged use and undue heating of brake drums, to the general end that undue lost motion in the brake linkage system is prevalent.

While the prior art shows a number of mechanisms for automatically taking up slack in mechanical linkage of power operated brakes, such structures are not readily applicable to conventional brake systems widely employed, and for the most part require setting adjustment and a multiplicity of parts which must be assembled during installation. Most of said prior art devices are not sealed in or self-contained and consequently in prolonged use infiltration of dirt, grit and moisture will substantially detract from their efficiency.

With present take-up adjustment mechanism adverse conditions frequently occur, particularly in travel over long downhill routes necessitating frequent and prolonged use of the brakes, that the brake drums expand to such an extent that an undue amount of automatic take-up is effected which when the brake drums are cooled to normal operating temperatures, causes binding or setting of the brakes. Operation of a heavy vehicle over long downhill routes sometimes effects a brake drag which may prevent operation of the vehicle until the brakes are adjusted or which may burn out metal parts and linings.

It is an object of my invention to provide extremely simple but highly efficient sealed and self-contained mechanism of the class described, wherein two sealed units, one an actuating lever-ratchet unit and another an "adjustment" ratchet unit are readily coupled in side by side relation, axially upon the conventional externally splined cam shaft of power brake operating linkage of the class described, and wherein said units may be readily slipped upon the conventional splined cam shafts of power braking mechanism without requirement of dissembly or disconnection of parts of the units or any adjustment thereof.

A further object is the provision of a very simple and highly efficient automatic brake-operating and adjustment assembly which can be readily assembled from the accessible end of a brake-operating cam shaft and wherein the parts of the assembly are so formed that they cannot come apart and will not require attention after being merely slipped upon the cam shaft, and wherein the assembly is entirely self-contained and sealed to exclude grit, dust and moisture which would otherwise in time impair the operation and efficiency of the power brake mechanism.

A further and very important object of my invention is to provide in close combinative relationship with mechanism of the class described, a temperature-responsive mechanism including a heat-sensing element related with the conventional brake drum of the overall power brake mechanism to automatically, through an electrical circuit, energize an electro-magnetic pawl-retractor whereby upon excessive heating and consequent expansion of a brake drum during travel over long downhill routes, the clearance setting between brake drum and shoes will automatically be increased to prevent binding of the brakes in subsequent operation.

Still another object is the provision in mechanism of the class described of an electrically operated pawl-retracting mechanism for release of the clearance-setting or adjusting ratchet, subject to control of the operator when desired.

The foregoing and other objects and advantages of the invention will be more apparent from the following description made in conjunction with the accompanying drawings wherein like reference characters refer to similar parts throughout the several views and wherein:

FIG. 1 is a side elevation of a brake drum, shoe spreading cam and my improved mechanism applied where application of braking power is supplied through a vacuum operated fluid motor with piston rod secured in pivotal relation to an actuating lever of my mechanism;

FIG. 2 is an exploded and somewhat diagrammatical perspective view showing the two essential self-contained units of my mehcanism applied to the conventional, externally splined cam shaft of power braking mechanism and having diagrammatically indicated an electrical circuit for temperature-actuated release of the adjustment or retaining pawl of my working clearance adjusting mechanism;

FIG. 3 is a view partly in end elevation with some parts broken away and others shown in section to illustrate the shiftable pawl and its combinative relationship with the associated ratchet and the electro-magnetic means for releasing said pawl; and FIG. 4 is a view partly in side elevation and partly in section taken along the lines 4—4 of FIG. 1 with my mechanism operatively installed upon the externally splined cam shaft of conventional power brake-operating devices.

Referring now to the embodiment of the invention illustrated, and particularly FIGS. 1 and 2 of the drawings, my novel and improved automatic adjusting mechanism is operatively associated with a conventional type of power brake operating apparatus which as shown in FIG. 1 includes a vacuum-operated piston or diaphragm mechanism indicated as an entirety by the numeral 6 and having a cylinder or drum 6a which is provided with a piston-actuated and adjustable actuating rod 6b having at its outer end a forked clevis 6c which is pivotally connected by a pin 6d to a substantially radial lever arm 7a integrally formed or rigidly connected with a self-contained, generally cylindrical housing enclosure indicated as an entirety by the letter 7 having a generally cylindrical housing 7b which is disposed concentrically and in spaced relation to the external periphery of a conventional, externally splined, shoe-expanding cam shaft S.

The longitudinal operation of the actuating rod 6b as shown in FIG. 1, imparts a pull on the lever 7a and the integral or rigidly connected housing 7 when the brake pedal is operated on the automotive vehicle in conventional manner and in the direction indicated by the arrow in FIG. 2 where a vacuum fluid motor is employed. It will of course be understood that in many conventional installations, the actuating rod 6b is actuated in an outward direction when brakes are applied in which instance the piston fluid motor would be disposed oppositely to the vacuum motor illustrated in FIG. 1.

My novel and improved slack take-up and clearance adjustment mechanism comprises a cooperating pair of self-contained and sealed units indicated as entireties by the letters A and B respectively. The actuating unit A comprising the housing body 7 with the rigidly connected lever arm 7a includes a ratchet wheel 8 having concentrically arranged ratchet teeth on the periphery thereof and having as shown, at opposite ends of the ratchet proper, concentric bosses 8a and 8b respectively which are concentrically disposed and of decreased diameter as contrasted with the peripheral orbit of the ratchet teeth. The ratchet wheel 8 is internally splined to be freely slipped upon and non-rotatably connected with the exteriorly splined, conventional cam shaft S.

The generally cylindrical body 7b of the housing enclosure-actuator 7 is internally provided with a pawl-accommodating and mounting chamber 7c which communicates with an exposed portion of the ratchet teeth 8c and forms at the left hand portion thereof as viewed in FIG. 2, a partial cylindrical journal 7d for the pivoted end of an elongated actuating pawl 9 which is mounted in chamber 7c. Pawl 9 has a forward tooth 9a which engages the ratchet teeth 8c and which is spring-pressed inwardly against the teeth by suitable yieldable means as shown, by a compression coil spring 10 which is mounted in a cylindrical socket 10a provided longitudinally in the lever arm 7a and which communicates at its inner end with an enlarged abutment portion 9b of the pawl.

The actuating lever housing 7 is suitably journaled upon the ratchet wheel 8 preferably upon the concentric bosses 8a and 8b thereof and to effect such journaling, I prefer to provide for inner and outer open ends of the generally cylindrical housing body 7b cover and sealing plates 11 and 12 respectively which are centrally apertured to closely fit for journaling, the respective bosses 8a and 8b of ratchet wheel 8 being secured as shown to the body 7b by screws 13 for each of said plates 11 and 12 which threadedly engage at their inner ends, spacer shoulders 14, the relationship of said two sets of screws and said circumferentially spaced spacer shoulders 14 clamping the cover and sealing plates 11 and 12 together and completing the self-contained actuating unit A with sealing effect at both ends thereof to exclude grit, dirt and moisture.

It will be obvious that when the rigidly connected lever arm 7a is pulled by the actuating rod 6b in the direction of the arrow shown in FIG. 2, the cam shaft S is turned through a predetermined angle depending upon the longitudinal movement of the rod 6b.

The "adjustment" and holding self-contained unit B comprising a generally cylindrical housing indicated as an entirety by the numeral 15 has an annular body 15a having as shown a rigidly attached holding arm 15b which is adapted to be attached at its outer end as by a pin 16 to a retaining lug 16a furnished by the fluid motor housing or any stationary part of the equipment. The adjustment and holding unit includes a ratchet wheel 17 having concentrically disposed ratchet teeth 17a and having also at opposite ends thereof, diminished bosses 17b and 17c disposed concentrically of the arrangement of the ratchet teeth and constituting journals for the housing body 15.

The housing body 15 has formed in a portion thereof an eccentrically disposed pawl-accommodating and mounting chamber 15c communicating with a portion of the periphery of the ratchet wheel 17. A shiftable adjustment and clearance-regulating pawl 18 is mounted in chamber 15c for a limited longitudinal shifting movement generally tangential to the associated teeth 17a of ratchet wheel 17 and for also limited protraction and retraction radially of the ratchet wheel. While various specific mounting elements for pawl 18 may be employed to obtain such essential functions, in the embodiment illustrated, one end of the pawl 18 is provided with a longitudinal slot 18a which is connected to the housing body 15a by a small pin 19, the slot 18a preferably being of a width to loosely fit said pin and of a length to permit longitudinal movement of said pawl through a predetermined restricted path preferably not greater in length than the cumulative circumference of two teeth of said ratchet wheel and at least permitting slippage of said pawl over one tooth of said ratchet wheel. The pawl 18 has a toothed end 18b adjacent the end opposite from said slot and pin connection which projects inwardly for engagement with a tooth of the ratchet wheel 17 and also arranged and constructed for slippage over one or more teeth of ratchet wheel 17.

In addition to the longitudinally shiftable mounting of pawl 18 the outer portion 18c thereof is as shown pivotally connected by a pin 20 with a radially and outwardly extending rod 21 which projects through an apertured boss 15d provided on the external appropriate portion of the housing body 15a. As shown, rod 21 is slidable through a tubular plug 21a having threaded connection with the boss 15d and is normally spring-pressed (not shown) inwardly to the position shown in FIG. 3. Rod 21 is connected with or constitutes the longitudinally movable armature of a solenoid device indicated as an entirety by the letter D and which as shown, is mounted upon the housing body 15 connected thereto by the tubular threaded plug element 21a. The solenoid device is of conventional structure having the stationary electro-magnetic coil (not shown) the ends of which are connected with terminals 22 and 23 respectively of an electrical circuit which includes as shown a manually operable switch X electrically connected with a battery or other source of electrical power P and connectible with a lead wire W.

The electrical circuit may also include a heat-sensing element E disposed upon or in close relation to the brake drum B.D., and responsive to the effective temperature within said drum, to operate a circuit switch which is connected by wires 24 and 25 with the terminals of a unit U to relay energizing voltage to the solenoid actuator D. The unit U may consist in such mechanism as a transistorized amplifier relay or other conventional unit for relaying the energizing current to the solenoid actuator responsive to the switch operated by the heat-sensing element E.

It will be understood that while the circuit as shown includes both a manually operated switch and the temperature-sensing switch for controlling energization of the solenoid device D, either of said switches per se may be utilized in the circuit with the solenoid all within the scope of my invention.

As in the case of my actuating unit A, the housing body of the self-contained "adjustment" and holding unit B is journaled upon the ratchet wheel 17, preferably upon the diminished bosses 17b and 17c thereof and is provided with cover and sealing plates 26 and 27 which are centrally apertured to snugly fit the said bosses for rotation thereon and which are shaped to completely close and seal the inner and outer ends or faces of the generally tubular housing body 15a. The two cover plates 26 and 27 are secured together, and with slight contact against the vertical faces of the ratchet bosses 17b and 17c by similar means to that illustrated in respect to the cover plates 11 and 12 of the actuating unit, such means comprising a plurality of generally annular spacing shoulders 28 having internally threaded ends which are secured to screws 13 applied to the inner and outer cover plates 26 and 27 respectively.

Referring again to the adjustment and clearance-regulating pawl 18, this pawl is urged inwardly and also to longitudinally advanced position by suitable resilient means (see FIG. 3) such as a contractile coil spring 29 having one end thereof engaged with the pin 20 and having its opposite end secured to the projecting ear 30a of an adjustable plug member 30 which is threadedly received in a tapped socket 31 formed in one side of the housing body 15a and which obviously may be threadedly adjusted to vary the tension on coil spring 29.

Operation

From the foregoing description and the drawings it will be readily observed that my novel mechanism comprises preferably two self-contained units, one an "actuating" unit for positively turning the conventional cam shaft of power brake mechanism widely used by heavy automotive vehicles and the second a combined retaining, slack-adjustment and brake-clearance-setting unit B, each having the working parts thereof completely enclosed and sealed and each readily adapted for mounting by slipping over on the free end of a conventional cam shaft.

No adjustment of the parts of either of the said units A and B is necessary in the assembly of the units upon the shaft and since the units A and B though closely cooperative are independent, they may be set in close side by side relation upon the shaft or they may be conveniently spaced apart where the longitudinally movable actuating rod 6b of a fluid piston motor is normally disposed in somewhat spaced relation from an anchoring lug or means for connection with the anchoring arm 15b of the second unit.

With the units operatively mounted by quick assembly upon cam shaft S when the actuating lever arm 7a is moved in the operative direction shown by the arrow in FIG. 2, the pawl 9 positively engages a tooth of the ratchet wheel 8 and turns the shaft S through a predetermined angulation dependent initially upon the stroke imparted to the actuating rod 6b.

In the actuating linkage illustrated in FIG. 1 the piston fluid motor is of the vacuum type whereby rod 6b imparts a pull upon the outer end of lever arm 7a when the power brakes are applied. Thus, when the brakes are released a thrust will be imposed on the lever arm 7a of the actuating unit A and the actuating pawl 9 will merely slip over a number of the ratchet teeth 8c of its associated ratchet wheel, the brake-cam shaft turning slightly in retracted influence through the presence of retaining springs in the floating brake shoe structure.

In such retractive turning of the cam shaft S and consequently the ratchet wheel 17 of the adjusting unit B since body 15a of unit B is held stationary, the pawl teeth 18b of the adjustment unit remain engaged with the teeth 17 of the associated ratchet but the slot and pin connection (pin 19 and pawl-slot 18a) causes the pawl to move along a very short tangential course with the teeth 18b still engaging ratchet teeth 17a until such movement is arrested by abutment of the pin 19 with the right hand end of the slot 18a as shown in FIG. 3. Thus, the units are so mounted that when the shaft S is in its normal or unbraked position the pin 19 will be disposed at the right side of slot 18a, as viewed in FIG. 3, of the holding pawl 18. As the shaft S is rotated to move the brake shoes to braking position, that is in a clockwise direction, then the pawl 18 is carried by the ratchet wheel 17 through a distance determined by the lost motion slot 18a, the pin 19 then being positioned at the left side of the slot. It will be seen that the spring 29 constantly urges the pawl 18 to the right, as viewed in FIG. 3, so that the pawl is maintained in engagement with one of the teeth of the ratchet wheel during rotation of the latter. Therefore, when the brakes are rotated the shaft S and the lever 7a return to their original position and pawl 18 is also moved relative to pin 19 so the latter is again positioned at the right end of the slot 18a. In other words from the effective braking position of the cam shaft S this shaft may be turned through a very slight angulation (usually preferably about 8 to 12 degrees), thereby releasing the brake shoes in clearance from the brake drum and thereafter the cam shaft is positively retained in the adjusted clearance position. However, when the brakes are in a condition of wear, the lever 7a in shaft S will be rotated an increased distance than normal. The pawl 18 will again rotate with the teeth of ratchet wheel 17 through the lost motion distance, but the pawl will thereafter, due to the increased shaft rotation, ratchet over a tooth or teeth of the ratchet wheel 17. Upon release of the brakes, the shaft S and lever 7a will then be rotated in a counter clockwise or return direction only through the lost motion distance defined by the slot 18a, the shaft S being then disposed in an adjusted position.

The actuating lever 7a of the unit A will of course be returned by direct engagement of pawl 9 through a comparable angulation but the thrust power supplied by actuating rod 6b will return the lever arm 7a to substantially normal at rest position, pawl 9 slipping over ratchet teeth 8c throughout the greater portion of the return or retractive swinging movement of the lever.

Thus it will be seen that the mechanism of my "adjustment" and brake-clearance maintenance unit B positively assures after each braking operation, a slight and predetermined clearance between the shoes and the brake drum. As the brake linings or other brake parts become worn, less clearance of course is desirable and wear is automatically compensated for by subsequent braking operations where the shoes are forcibly applied for proper power braking against the drum through the cooperating actuating unit A, and whereafter in the retractive turning of cam shaft S impelled by spring means interposed between the floating ends of the shoes the adjustment and retaining pawl 18 of unit B yields through a very limited turning, preferably not exceeding circumferential movement of two ratchet teeth 17a and then positively holds the ratchet wheel 17 and consequently the cam shaft S in the position shown in FIG. 3. Thus in said last mentioned brake-applying action and release a new and closer clearance-setting position is automatically obtained and the slack between linkage and the clearance between brake shoes and drum is taken up.

Where, in the driving of a heavy motor vehicle over long downward stretches of road brakes must be frequently applied, the working brake parts including drum and shoe expand with the high temperature heat produced and under usual conditions the brake mechanism may become set or jammed. With my system and structure as illustrated in FIG. 2, the driver may manually operate the switch X to momentarily release through the actuation of the electrical circuit, the holding pawl 18b or if the heat-responsive element E for actuating the relay mechanism U is employed, the element E when a predetermined temperature is attained in the braking structure, automatically energizes through electrical current the relay mechanism U which controls the solenoid mechanism D and the holding pawl 18b of the adjustment unit is retracted, allowing the brakes to subsequently cool and immediately relieving any tendency of the brakes to jam. Subsequently when the brake parts are cooled, the first braking operation and retraction of cam shaft S automatically resets the relationship of brake clearance at the desired point of efficiency.

Thus, it will be seen with my closely cooperating units A and B and the solenoid-actuated release of holding pawl 18b an important safety factor is provided for the brakes of heavy automotive vehicles to prevent burning out of brake linings and jamming of brakes when the vehicle has to be frequently braked as in long downhill courses.

From the foregoing description it will be seen that as contrasted with the prior art, I have very substantially simplified mechanism and a system for very accurately taking up slack due to wear in power braking systems and for automatically determining most effective clearance relation between brake shoes and drum. It will further be seen that all of the parts of my cooperating mechanism and system are sealed and the units self-contained, ready for quick and accurate attachment to many types of conventional power braking systems now in use by merely slipping the two units A and B in a number of different spaced positions upon the accessible end of a conventional externally splined brake-camming shaft.

It will of course be understood that various changes may be made in the form, details, arrangement and proportions of the parts without departing from the scope of my invention.

What is claimed is:

1. Automatic slack take-up and clearance-adjustment mechanism for cam-operated automotive brakes which employ in linkage an actuating rod and lever connected with a cam shaft for spreading the floating ends of brake shoes apart, a pair of coaxial, cooperating and self-contained units both disposed axially and surrounding said cam shaft, the first or "actuating" unit having a ratchet wheel non-rotatably connected with said cam shaft and provided with concentrically arranged ratchet teeth and having a concentric bossed portion, said unit having a generally cylindrical housing enclosure surrounding said ratchet wheel and being rotatably connected with said bossed portion and also having an externally and substantially radially disposed actuating arm for connection with the actuating rod of said brake-operating mechanism, said housing also having an internal, accommodating chamber disposed eccentrically thereof and communicating with the teeth of said ratchet, a toothed ratchet engagement member mounted in said chamber and guided thereby and having a tooth directed toward said ratchet teeth, yieldable means urging said tooth against said ratchet teeth, the second or "adjustment" unit comprising an independent and generally cylindrical housing having a holding medium rigidly and externally affixed thereto and also comprising a ratchet wheel journaled in said housing and non-rotatably connected with said camming shaft, said last mentioned housing having an internal, pawl-mounting and accommodating chamber disposed eccentrically thereof and communicating with said ratchet, a pawl shiftably mounted within said last mentioned chamber and having a tooth extending toward the teeth of said last mentioned ratchet wheel, mechanism for mounting said pawl to permit retraction and protraction of said tooth relative to the teeth of said associated ratchet wheel and to further permit general movement of said pawl along a limited path extending tangential to said ratchet teeth whereby said pawl tooth may override at least one tooth of said ratchet wheel and yieldable means urging said pawl to advanced position relative to said ratchet teeth.

2. The structure set forth in claim 1 further characterized by each of said housing having a generally annular open ended body and covering means for the open end of said body of each housing forming substantially sealed connection with said body and the respective bosses of said ratchet wheels.

3. The structure set forth in claim 1 wherein the mounting mechanism for the shiftable pawl of said second or "adjustment" unit comprises slot and pin elements wherein the slot extends generally tangentially to the path of said associated ratchet teeth and a pivot element disposed outwardly and to one side of said pin and slot element for facilitating swingable retraction of said pawl-tooth, and resilient means for urging said pawl to advanced position relative to said ratchet teeth and also inwardly to engage said ratchet teeth.

4. Automatic slack take-up and clearance-adjustment mechanism for cam-operated brakes which employ an actuating rod and lever connected with a cam shaft for spreading the floating ends of brake shoes apart, having in combination a pair of concentrically toothed ratchet wheels both non-rotatably connected with said cam shaft, a swingable actuating lever structure connecting with said actuating rod and having a body substantially surrounding one of said ratchet wheels, said body internally carrying a releasable toothed member spring-pressed against said associated ratchet wheel, a stationary holding member having a body substantially surrounding the second of said ratchet wheels and having an internal, accommodating chamber communicating with the teeth of said second ratchet wheel, a toothed member shiftably mounted within said last mentioned chamber for protraction and retraction against said associated ratchet wheel, means for also mounting and guiding said toothed member for very limited movement in a line of travel generally tangential to the arrangement of said ratchet teeth whereby in operation said toothed member may slip over at least one of said ratchet teeth upon retraction of said actuating lever structure, electro-magnetic mechanism for retracting said last mentioned pawl and an electrical circuit including said last mentioned magnetic retraction means for controlling operation of the same.

5. The structure set forth in preceding claim 4 and a heat-sensing element mounted for response to temperature within the brake drum of the braking mechanism and an electrical switch included in said circuit and actuated by said heat-sensing element when the temperature within said brake drum has reached a predetermined degree.

6. Automatic slack take-up and clearance-adjustment mechanism for cam-operated brakes which employ an actuating element and lever connected with a cam shaft for spreading apart the floating ends of a pair of brake shoes, having in combination a pair of axially disposed ratchet members, both non-rotatably connected with said cam shaft, a swingable actuating lever structure connected with said actuating element and having a body rotatably connected with one of said ratchet wheels but also carrying a retractible toothed member normally engaged with said associated ratchet wheel, a stationary holding member having a body associated with the second of said ratchet wheels and having a releasable holding member for engaging the teeth of said second ratchet wheel, said last mentioned member being mounted to permit very limited retractive turning of said cam shaft after braking operation and to thereafter positively hold said shaft against further turning, a retracting solenoid connected with said holding body and connected at its inner portion with said releasable holding member to at least momentarily retract the same, an electrical circuit for energizing said solenoid and switch means for controlling said circuit.

7. The structure set forth in preceding claim 6, a temperature-sensing element associated with the actual braking mechanism, an electrical switch actuated by said sensing mechanism for closing the electrical circuit through said solenoid when the temperature of said braking mechanism has attained a predetermined point.

8. Automatic slack take-up and clearance-adjustment mechanism for cam-operated automotive brakes which employ in linkage an actuating rod and lever connected with a cam shaft for spreading the floating ends of brake shoes apart, having in combination a pair of coaxial cooperating units, both disposed axially of and surrounding said cam shaft, the first or "actuating" unit having a ratchet wheel affixed for rotation to said cam shaft and provided with concentrically arranged ratchet teeth and having a concentric boss portion, said unit having a reinforcing housing surrounding and enclosing said ratchet wheel and said boss and being rotatably connected with said boss and also having an externally disposed actuating arm rigidly mounted thereon for connection with the actuating rod of said brake-operating mechanism, said housing also having a chamber disposed eccentrically thereof and communicating with the teeth of said ratchet, a yieldable toothed element accommodated and guided in said chamber and having at least one tooth for engagement with the teeth of said ratchet and resiliently urged against said ratchet teeth, the second or "adjustment" unit comprising a ratchet wheel affixed for rotation to said cam shaft and provided with a concentric boss and having also concentrically arranged ratchet teeth directed in the same direction as the teeth of said first mentioned ratchet wheel, said second unit also comprising a reinforcing housing enclosing said second ratchet wheel and said last mentioned boss and being rotatably connected with said boss, said last mentioned housing having a guiding chamber communicating with the space surrounding said last mentioned ratchet wheel, a toothed ratchet-engaging element being shiftably mounted within said chamber to permit general movement thereof along a limited path extending tangential to said ratchet teeth whereby the effective tooth of said ratchet-engaging element may override at least one tooth of said ratchet wheel in retractive rotation of said cam shaft, and means for urging said tooth element to advanced position relative to said ratchet teeth.

9. The structure set forth in claim 8 and each of said units being self-contained and having sealing means for enclosing said ratchet wheel, said boss and the respective toothed ratchet wheel engagement elements, and the ratchet and bossed elements of said units being slidably keyed upon said cam shaft for independent mounting of said units and variable spaced relation upon said cam shaft.

References Cited in the file of this patent

UNITED STATES PATENTS

| | | |
|---|---|---|
| 1,525,568 | Chapin | Feb. 10, 1925 |
| 1,988,413 | Bing | Jan. 15, 1935 |
| 2,109,284 | Brinck et al. | Feb. 22, 1938 |
| 2,109,637 | Gutkaiss | Mar. 1, 1938 |
| 2,296,026 | Freeman | Sept. 15, 1942 |
| 2,650,681 | Shively | Sept. 1, 1953 |

FOREIGN PATENTS

| | | |
|---|---|---|
| 766,811 | France | Apr. 23, 1934 |
| 471,519 | Great Britain | Sept. 6, 1937 |